June 5, 1934.  M. KNOBEL  1,961,768

SYNCHRONOUS MOTOR DRIVEN CLOCK

Filed Jan. 8, 1932

Inventor
Max Knobel

By R. Clay Lindsey.

Attorney

Patented June 5, 1934

1,961,768

UNITED STATES PATENT OFFICE 1,961,768

SYNCHRONOUS MOTOR DRIVEN CLOCK

Max Knobel, Arlington, Mass., assignor to Barss, Knobel & Young, Inc., Cambridge, Mass., a corporation of Massachusetts Application January 8, 1932, Serial No. 585,484

1 Claim. (Cl. 172—275)

The present invention relates to electric clocks of the synchronous motor type and adapted to be driven by an alternating current supplied to consumers of electric light and power service.

Clocks of this type usually have synchronous motors which may be started by imparting to the rotor, either manually or automatically, a rotary movement greater than that which the rotor has when it is running in synchronism, and then permitting the rotor to drop back until it gets in step. Various expedients have been proposed to assist the rotor in assuming a synchronous speed and in maintaining that speed, but these expedients are open to numerous objections, among which may be mentioned the additional cost, the introduction of wear and inaccuracies, the requirement of additional space, et cetera. For example, it has been proposed to provide clocks of this sort with an inertia disk surrounding the rotor shaft and a spring connection between the disk and the shaft. Such an arrangement requires a rotor shaft of substantial diameter, and results in friction which is excessive compared with the power of the motor. Additionally, such an arrangement is more or less expensive, as it comprises a number of parts, and care must be taken to properly mount the same.

The object of this invention is to overcome these and other difficulties, and, more particularly, to provide a clock mechanism of this type which may be easily started and which will maintain the desired synchronous speed without interruption so long as the alternating current is supplied, and to accomplish these results by a simple, cheap, and dependable structure.

The present invention contemplates a synchronous motor driven clock mechanism having a train of gears mounted on suitable shafts and connected to the rotor shaft so as to be driven thereby, and an inertia element or disk preferably on the first shaft of the train, there being sufficient lost motion between the gears to permit the inertia disk to perform the desired functions. With this arrangement, the rotor shaft, being relieved of the weight of the inertia element, may be relatively light and of smaller diameter and, therefore, has less friction. Also, this arrangement provides for extreme simplicity in arrangement and construction and cheapness in manufacture. In fact, the means for effectively causing or assisting the rotor after it has been initially set in rotation to assume a synchronous speed and to accurately maintain that speed consists of but a single member which may have a close fit on the shaft on which it is located and without requiring any more space than the clock movement would occupy were it not provided with such an inertia element.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claim.

In the accompanying drawing, wherein is shown one embodiment which the present invention may take:

Figure 1:
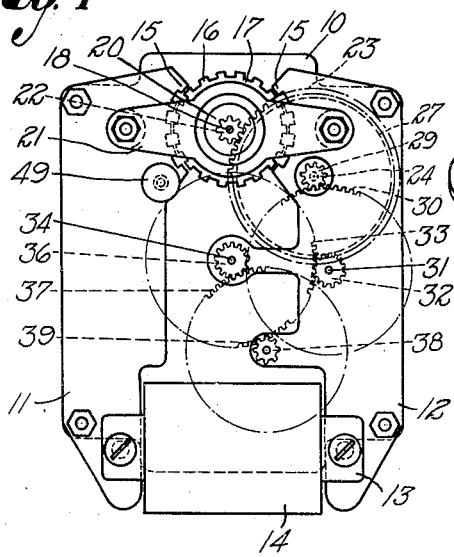
Fig. 1 is a rear elevation of a synchronous motor embodied in a clock frame and disclosing the features of the present invention.
Figure 2:
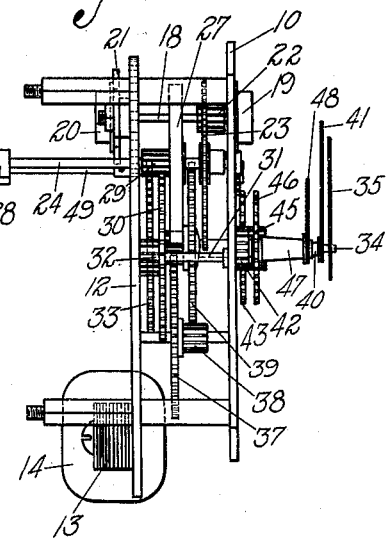
Fig. 2 is a side elevation of the same.
Figure 3:
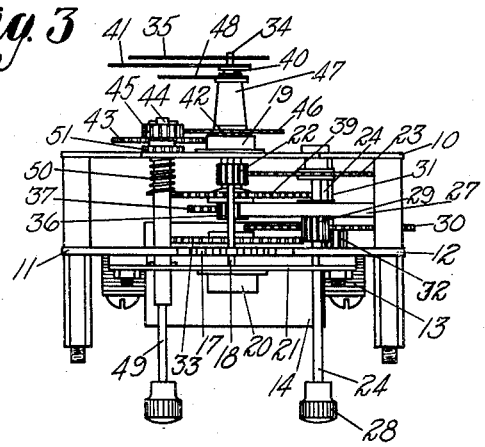
Fig. 3 is a top plan view thereof.
Figure 4:
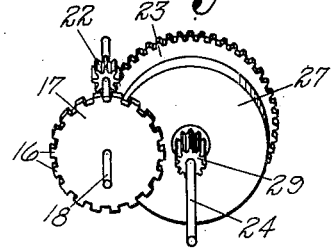
Fig. 4 is a detail perspective view of the rotor of the motor showing its connection to the first shaft of the gear train and showing the inertia member mounted on the latter.

Referring now to the drawing, which shows somewhat diagrammatically the synchronous motor combined with a gear train of a clock mechanism, 10 designates the front frame and 11 and 12 designate the sections of the rear frame, the sections 11 and 12 also comprising the opposed pole pieces of the stator of the motor. The lower ends of the pole pieces or frame members 11 and 12 are connected together by a transversely extending laminated core 13 which comprises a suitable number of laminations upon which a coil 14 is mounted, and the lower portions of the pole pieces 11 and 12 may be recessed or otherwise suitably constructed to accommodate the end portions of the coil. The upper ends of the pole pieces 11 and 12 are spaced apart and provided with spaced projections 15 for cooperation with spaced projections 16 upon a rotor 17 which is positioned between, and in slightly spaced apart relation from, the adjacent ends of the pole pieces 11 and 12. The rotor 17 is mounted upon a shaft 18 which is supported at its front end in a bearing 19 carried by the front plate 10 and which, at its rear end, is mounted in a bearing 20 supported on a non-magnetic cross piece 21 formed of brass or the like. The rotor shaft 18 is provided adjacent the inner side of the front frame 10 with a pinion 22 which meshes with a gear wheel 23 fixed upon the first shaft 24 of a gear train.

The gear wheel 23 may be of fibre construction to insure the even and quiet operation of the motor and gear train. The shaft 24 carries an inertia member or fly wheel 27 which is fixed to the shaft, as by a driving fit. This inertia member is adapted to govern or regulate the rotor 17 to insure the steady and even operation of the mechanism and to carry the rotor past dead points in the operation of the motor and prevent over-running of the motor; thus insuring true synchronous operation of the rotor.

The shaft 24 projects rearwardly from the frame and is provided with a thumb piece 28 by means of which the shaft 24 may be spun for starting the motor. The shaft 24 also has, between the frames, a pinion 29 which meshes with a gear wheel 30 carried upon a shaft 31 also equipped with a pinion 32 meshing with another gear 33 on a shaft 34 in the gear train. The shaft 34 extends through the frames and carries a second hand 35 upon its forward end. The shaft 34 carries a pinion 36 with which meshes a gear wheel 37 provided with a pinion 38 which meshes with a gear 39 mounted on a hollow shaft 40 arranged about the shaft 34 and which carries a minute hand 41 upon its outer end rearwardly of the second hand 35.

The hollow shaft 40 also carries a pinion 42 at the outer side of the front frame 10 which meshes with a gear 43 mounted upon an idler shaft 44 mounted on the front frame 10. The gear 43 carries a pinion 45 which meshes with a gear 46 carried upon the rear end of an outer shaft 47 arranged concentrically about the shafts 34 and 40. The shaft 47 carries an hour hand 48 inwardly of the minute hand 41.

A slidable hand setting shaft 49 is mounted in the frames, is normally urged into a retracted position by a spring 50, and carries a pinion 51 at its outer end adapted to be advanced into engagement with the gear wheel 43 for turning the latter and the minute and hour hands 41 and 48 to properly set the hands. As is usual, the various gears connecting the hands 41 and 48 to the gear train admit of the necessary slippage when forced by manually turning the shaft 49.

In operation, when the coil 14 is in circuit with a source of alternating current, the knob 28 may be twirled between the fingers to spin the shaft 24 at a relatively high rate of speed and thus turn the fly wheel 27, the train of gears, and the rotor 17 with its shaft 18. The inertia of the fly wheel insures a somewhat gradual and uniform reduction in speed of the rotor 17 and the gear train until the rotor drops into phase with the electric current, at which time the fly wheel settles into a uniform or constant normal speed and, by its force of inertia, prevents the rotor from lagging or accelerating beyond the slight variations permitted through the lost motion between the teeth of the pinion 22 and the gear wheel 23. It will be noted that the rotor shaft 18 may be relatively light in weight, and also the rotor itself may be relatively light so that the motor as a whole may be of light construction. The first shaft 24 of the gear train may, if found necessary, be increased in weight sufficiently to support the fly wheel 27 and provide ample bearing surface for supporting the shaft 24 with the fly wheel. The gear wheel 23 has a certain lost motion connection with the shaft 18 through the pinion 22, and this lost motion connection is sufficient to allow the rotor 17 to find its synchronous position in phase with the current incident to any slight variations in the cycles thereof.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim as my invention:

In an electric clock, a synchronous motor having a rotor and a shaft to which said rotor is fixed, a gear train having a first shaft, a manually operable member and an inertia wheel fixed upon said first shaft of the gear train, to start and regulate said motor, a pinion on said rotor shaft and a gear on said first shaft having teeth meshing with corresponding teeth on said pinion, said teeth being so proportioned as to provide a lost motion connection between said gear and pinion, whereby said wheel will properly perform its functions of starting and regulating said motor.

MAX KNOBEL.